United States Patent [19]
Benzel et al.

[11] Patent Number: 5,421,027
[45] Date of Patent: May 30, 1995

[54] METHOD AND APPARATUS FOR GENERATING A PIN INTERRUPT REQUEST IN A DIGITAL DATA PROCESSOR USING A DUAL FUNCTION DATA DIRECTION REGISTER

[75] Inventors: Janice L. Benzel; Nigel J. Allison, both of Austin, Tex.

[73] Assignee: Motorola, Inc., Schaumburg, Ill.

[21] Appl. No.: 248,562

[22] Filed: May 24, 1994

Related U.S. Application Data

[63] Continuation of Ser. No. 743,655, Aug. 12, 1991, abandoned.

[51] Int. Cl.6 .................................................. G06F 7/02
[52] U.S. Cl. ................................. 395/800; 364/273.1; 364/948.8; 364/941; 364/941.1; 364/947; 364/947.2; 371/24
[58] Field of Search ................. 364/230.2, 941, 273.1, 364/948.8

[56] References Cited

U.S. PATENT DOCUMENTS

| | | | |
|---|---|---|---|
| 4,404,627 | 9/1983 | Marcantonio | 395/725 |
| 4,764,893 | 8/1988 | Karabatsos | 395/725 |
| 4,918,599 | 4/1990 | Hashimoto et al. | 395/725 |
| 4,961,067 | 10/1990 | Suzuki | 340/146.2 |
| 5,083,266 | 1/1992 | Watanabe | 395/275 |
| 5,129,091 | 7/1992 | Yorimoto et al. | 395/750 |
| 5,237,692 | 8/1993 | Raasch et al. | 395/725 |
| 5,287,523 | 2/1994 | Allison et al. | 395/725 |
| 5,303,390 | 4/1994 | Little | 395/575 |

OTHER PUBLICATIONS

National Semiconductor Microcontroller Data Book, 1988 Edition, pp. 2-132 and 2-133 (partial).
Microcontroller Databook; National Semiconductor; Multi-Input Wakeup 1988 pp. 2-132.

*Primary Examiner*—Parshotam S. Lall
*Assistant Examiner*—Kenneth R. Coulter
*Attorney, Agent, or Firm*—Susan C. Hill

[57] ABSTRACT

A pin generated interrupt system in a digital data processor is capable of generating interrupt requests in order to awaken the digital data processor from a reduced state of activity and power consumption called stop mode. The user can permanently disable the pin generated interrupt system using a mask option chosen during the manufacturing process. A register bit that determines whether the pin is an input or an output is also used to enable compare circuitry that determines whether an external device is requesting an interrupt. When a plurality of pins are used, it is only necessary for an interrupt to be requested on one of the pins in order for an interrupt request signal to be generated.

9 Claims, 2 Drawing Sheets

METHOD AND APPARATUS FOR GENERATING A PIN INTERRUPT REQUEST IN A DIGITAL DATA PROCESSOR USING A DUAL FUNCTION DATA DIRECTION REGISTER

This application is a continuation of prior application Ser. No. 07/743,655, filed Aug. 12, 1991, now abandoned.

FIELD OF THE INVENTION

The present invention relates in general to data processors, and more particularly to interrupt generation in a digital data processor.

BACKGROUND OF THE INVENTION

Interrupts are a well known method of altering the processing flow in a digital data processor in response to an external event. For instance, in a microcomputer which is controlling the operation of an electromechanical system, a change of state of the system may require the generation of an interrupt request to trigger the microcomputer to alter its processing flow in order to perform some special function. The indication that a change of state has occurred is often in the form of information transmitted across one or more individual wires which is received at one or more pins of the microcomputer. Circuitry either external to or internal to the microcomputer then determines whether an interrupt request should be generated.

Some microcomputers today now allow the user to shut down a great deal of the electrical activity on the microcomputer chip, such as the clocks, in order to reduce power consumption when the microcomputer is not actively needed. The microcomputer is then "wakened" from this stop mode by an interrupt generated from either an internal stimulus or from a stimulus received at one or more external pins.

SUMMARY OF THE INVENTION

The previously mentioned needs are fulfilled and other advantages achieved with the present invention. In one form, the present invention comprises a pin generated interrupt in a data processing system and a method of generating such an interrupt. The system comprises an interrupt request conductor having a logic state, an internal communication bus, one or more integrated circuit pins, and one or more bi-directional data communication interface circuits each of which is coupled between the internal communication bus and a respective one of the integrated circuit pins. Each of the one or more interface circuits has a first storage element for storing data communicated from the internal communication bus. Each of the one or more interface circuits also has a second storage element both for selecting a desired condition for a respective integrated circuit pin and for enabling a comparison function of logic states between a logic state of a data bit stored in the first storage element and a logic state on the respective integrated circuit pin.

The present invention will be understood by one skilled in the art from the detailed description below in conjunction with the accompanying drawings.

DESCRIPTION OF THE PREFERRED EMBODIMENT

Figure 1:
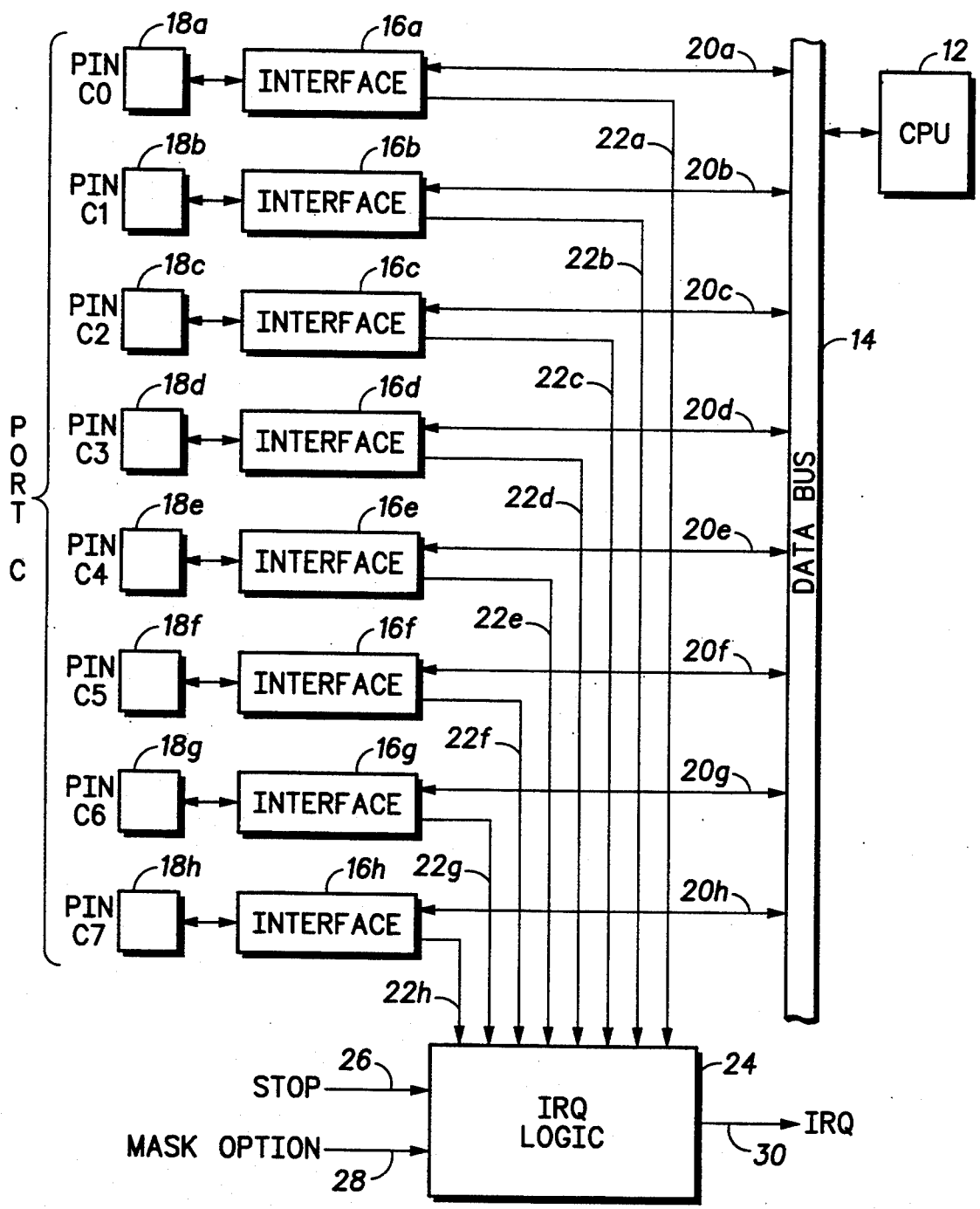
FIG. 1 illustrates, in block diagram form, a microcomputer having a pin generated interrupt in accordance with one embodiment of the present invention.

FIG. 1 illustrates an example of a microcomputer 10, which is a type of digital data processor. Microcomputer 10 has an eight bit port (PORT C) that allows the chip to communicate with devices (not shown) which are external to the chip. By communicating through PORT C, external devices can cause the microcomputer 10 to generate an interrupt if the microcomputer 10 is in a state of reduced activity called "stop" mode.

The microcomputer 10 has a central processing unit (CPU) 12 which is bi-directionally connected to a data bus 14 which is used for internal data communications. The data bus 14 is connected to eight interface circuits 16a–16h, respectively, by way of eight bidirectional bit lines 20a–20h, respectively. Each of the eight interface circuits 16a–16h is bi-directionally connected to one of eight pins 18a–18h. The eight pins 18a–18h together form PORT C (also referred to as pins C0–C7, respectively).

Additionally, each of the eight interface circuits 16a–16h is connected to IRQ logic 24 by way of eight bit lines 22a–22h, respectively. IRQ logic 24 receives a STOP input 26 which indicates whether or not the microcomputer 10 is active or in stop mode, and a MASK OPTION input 28 which indicates whether or not the user has chosen to enable the generation of interrupts from the pins of PORT C. IRQ logic 24 generates an output signal IRQ 30 which indicates to the microcomputer 10 that an interrupt has been requested by an external device connected to PORT C.

Figure 2:
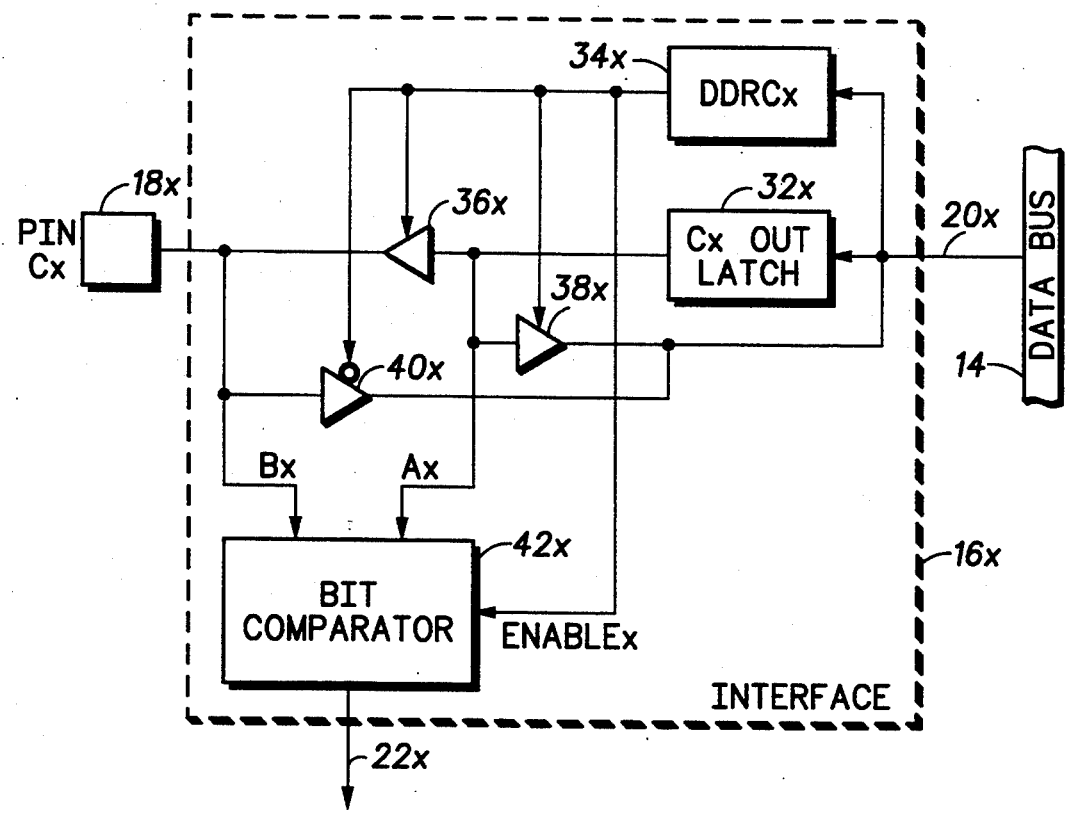
FIG. 2 illustrates, in block diagram form, an interface circuit of FIG. 1 in accordance with one embodiment of the present invention.

FIG. 2 illustrates in greater detail the structure of the interface circuits 16a–16h of FIG. 1. A particular interface circuit, 16x, has an output latch 32x, a data direction register bit 34x, three strobed buffers 36x, 38x and 40x, and a bit comparator 42x. Data direction register bit 34x stores one bit which determines whether a pin 18x is being used as an input pin or as an output pin. Data direction register bit 34x has an input connected to bit line 20x, and bit line 20x is connected to data bus 14. Data direction register bit 34x has an output which is connected to an enable input of bit comparator 42x, and which is also connected to enable inputs of strobed buffers 36x, 38x and 40x.

Interface circuit 16x is configured for output by storing a logic "1" in the data direction register bit 34x. The value stored in the data direction register bit 34x enables strobed buffers 36x and 38x and disables strobed buffer 40x. A data value from data bus 14 is brought to interface circuit 16x by bit line 20x, is latched by out latch 32x and is placed on pin 18x via strobed buffer 36x. In addition, this data value is routed back to data bus 14 via strobed buffer 38x and bit line 20x in order that the microcomputer 10 may accurately read the value in out latch 32x.

Interface circuit 16x is configured for input by storing a logic "0" in the data direction register bit 34x. The value stored in the data direction register bit 34x enables strobed buffer 40x and disables strobed buffers 36x and 38x. Thus a read of PORT C by the microcomputer 10 while interface 16x is configured as an input will produce the data value currently appearing at pin 18x.

Bit comparator 42x has an input Ax from out latch 32x and an input Bx from pin 18x. It is important to note that bit comparator 42x uses the data direction register bit 34x as an enable input ENABLEx. A separate register bit is not needed. Interface circuit 16x uses the information that the pin has been configured as an input, which is indicated by the value stored in the data direction register bit 34x, to enable the bit comparator 42x. The value in out latch 32x represents the value that the user expects an external device to place on pin 18x when requesting interrupt service. Bit comparator 42x has an output bit line 22x which indicates whether the value on the pin 18x is the same as the value the user has written into the out latch 32x. If the values are the same, that indicates that an external device coupled to pin 18x is requesting interrupt service.

Figure 3:
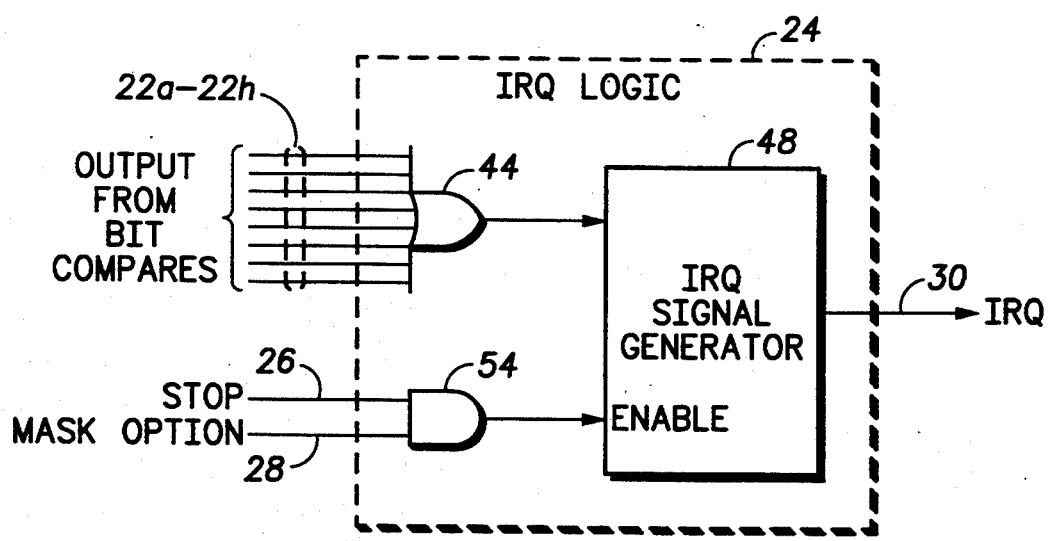
FIG. 3 illustrates, in partial logic diagram form, an interrupt request (IRQ) logic circuit of FIG. 1 in accordance with one embodiment of the present invention.

FIG. 3 illustrates in greater detail the structure of the IRQ logic 24 of FIG. 1. Each of the eight interface circuits 16a–16h is connected to IRQ logic 24 by way of eight bit lines, 22a–22h, respectively. Each bit line 22x represents whether the external device connected to pin 18x is requesting interrupt service. The eight bit lines, 22a–22h, are logically ORed together using an OR gate 44 so that any one request for interrupt service at any one pin 18x will cause the output of OR gate 44 to be asserted. The output of OR gate 44 is an input to an IRQ signal generator 48.

STOP input 26 is a signal, generated either external or internal to the microcomputer 10, which is used to indicate that the microcomputer 10 has been placed into a less active state called stop mode. The purpose of placing the microcomputer 10 in stop mode is usually to save power by stopping all nonessential activity. Because the particular microcomputer 10 used in the present embodiment is a static design, clock signals (not shown) which are used to clock the digital circuitry can be stopped in an orderly fashion to save power during stop mode. Also, because the clocks are stopped in an orderly fashion when stop mode is entered, no important information is lost by the microcomputer and it is able to resume operating where it left off when the STOP input 26 is negated and stop mode is exited.

MASK OPTION input 28 is a signal generated internally on the chip. The user of the microcomputer selects a mask option (not shown) by using a mask option layer (not shown) during manufacturing. The selected mask option determines whether or not PORT C will ever be able to generate an interrupt. This is a "yes" or "no" choice by the user, and once made during the manufacturing process, it cannot subsequently be changed. So any microcomputer 10 design using the present invention only allows for two possible choices regarding the enabling of PORT C interrupts. And once that option is chosen, it becomes part of the circuitry of that particular chip. So a user who chooses to never use PORT C to request interrupts can buy data processor 10 chips that all have MASK OPTION inputs 28 negated, and a user who may use PORT C to request interrupts can buy data processor 10 chips that all have MASK OPTION inputs 28 asserted.

STOP input 26 and MASK OPTION input 28 are both inputs to an AND gate 54, and the output of AND gate 54 is connected to an enable input of IRQ signal generator 48. Only if both STOP input 26 and MASK OPTION input 28 are asserted will the IRQ signal generator 48 be enabled. IRQ signal generator 48 has output signal IRQ 30 which sends an interrupt request signal to the appropriate logic (not shown) on microcomputer 10. The assertion of output signal IRQ 30 indicates that one or more external devices connected to PORT C is requesting interrupt service, that microcomputer 10 is in stop mode, and that the user selected the mask option that allows PORT C to generate an interrupt.

In conclusion, the present invention provides a mechanism and technique to allow external devices connected to pins of a microcomputer to "wake" the microcomputer from a stop mode of reduced activity and reduced power consumption. The user can choose a mask option that either enables or disables this ability of external devices to "wake" the microcomputer. The invention also uses the fact that a pin is configured as an input to enable the compare function that determines whether the external device coupled to that pin is requesting interrupt service. Additionally, when multiple pins are enabled to generate interrupts, any one external device can request interrupt servicing. It is not necessary to have a pattern on a series of pins before interrupt servicing can be requested.

The present invention is particularly useful for microcomputer applications that require a low power stop mode. Stop mode is needed in order to reduce the power consumed by the microcomputer when it is not being utilized in a system. An example of such a use is any backup system that remains dormant until the primary system fails. Another example is any system that has a limited power supply and that only needs to operate on a periodic basis. For example, a battery powered remote sensing device that takes measurements every 10 minutes, such as a device worn by a person to monitor heart rate or blood pressure as that person goes about his or her normal activities.

Often it is desirable to have the microcomputer only exit stop mode when an external stimulus is received indicating that use of the processor is now required. Utilizing existing port pins, the disclosed method and apparatus will allow- product manufacturers who are using microcomputers in their products to use a low power stop mode and to wake the microcomputer only when it is needed. The present invention uses a minimum amount of logic to implement this functionality.

While the present invention has been shown and described with reference to specific embodiments, further modifications and improvements will occur to those skilled in the art. For example, the microcomputer 10 may or may not be contained on a semiconductor chip. The data bus 14 can be of different types, such as serial or parallel, and can be time multiplexed or not. The number of pins contained in PORT C can be any number, from as few as one to as many as desired. It is to be understood, therefore, that this invention is not limited to the particular forms shown and that it is intended in the appended claims to cover all modifications that do not depart from the spirit and scope of this invention.

We claim:

1. A digital data processor, comprising:
   a communication bus;
   a plurality of integrated circuit pins, each of said plurality of integrated circuit pins having a pin logic state;
   a plurality of interface circuits, each of said plurality of interface circuits corresponding to a corresponding one of said plurality of integrated circuit pins, each of said plurality of interface circuits being coupled to said communication bus and being coupled to the corresponding one of said plurality of integrated circuit pins; and interrupt generation circuitry, coupled to said plurality of interface circuits;

wherein each of said plurality of interface circuits comprises:

a first storage means for storing a predetermined data value, said first storage means being coupled to said communication bus;

a comparator for receiving an enable signal, in response to assertion of the enable signal, said comparator comparing the pin logic state of the corresponding one of said plurality of integrated circuit pins with the predetermined data value and providing a comparison result signal, said comparator being coupled to said first storage means; and a second storage means for selectively asserting the enable signal and for selectively allowing data input transfer from the corresponding one of said plurality of integrated circuit pins to said communication bus if said second storage means stores a first predetermined control value, and for selectively allowing data output transfer from said communication bus to the corresponding one of said plurality of integrated circuit pins if said second storage means stores a second predetermined control value, said second storage means being coupled to said communication bus and to said comparator; and wherein said interrupt generation circuitry comprises:

a first logic circuit, said first logic circuit receiving the comparison result signal from each of said plurality of interface circuits, said first logic circuit performing one of a logical OR operation and a logical NOR operation, said first logic circuit providing a first logical result signal;

a second logic circuit, said second logic circuit receiving a stop signal and a mask option signal, the mask option signal having a mask option logic state which is fixed and made unchangeable during manufacture of the digital data processor, said second logic circuit providing a second logical result signal; and a third logic circuit, said third logic circuit selectively providing an interrupt request signal in response to receiving the first and second logical result signals, said third logic circuit being coupled to said first and second logic circuits.

2. A digital data processor as in claim 1, wherein the interrupt request signal is asserted to request an interrupt if the comparison result signal from at least one of said plurality of interface circuits indicates a match, if the stop signal indicates that the digital data processor is in a state of reduced activity, and if the mask option signal indicates that pin interrupts have been enabled.

3. A digital data processor as in claim 1, further comprising:

a central processing unit, coupled to said communication bus.

4. A digital data processor as in claim 1, wherein the first storage means comprises:

a first register bit.

5. A digital data processor as in claim 4, wherein the second storage means comprises:

a second register bit.

6. A digital data processor as in claim 5, further comprising:

a central processing unit, coupled to said communication bus, the central processing unit providing the predetermined data value to the first register bit via said communication bus if the second storage means is storing the second predetermined control value.

7. A digital data processor as in claim 6, wherein the central processing unit provides one of the first and second predetermined control values to the second register bit via said communication bus in order to change direction of data output transfer.

8. A digital data processor as in claim 1, wherein the plurality of integrated circuit pins and the plurality of interface circuits comprise a port of the digital data processor.

9. A digital data processor as in claim 8, wherein the port is eight bits wide.

* * * * *